(12) United States Patent
Rizzardini et al.

(10) Patent No.: US 11,516,409 B2
(45) Date of Patent: Nov. 29, 2022

(54) METHOD FOR DETERMINING THE FREQUENCY OF AN ALTERNATING CURRENT AND RELATED COMPUTER PROGRAM PRODUCT, FREQUENCY SENSING GROUP AND ELECTRONIC APPARATUS COMPRISING THE SENSING GROUP

(71) Applicant: STMICROELECTRONICS S.r.l., Agrate Brianza (IT)

(72) Inventors: Federico Rizzardini, Settimo Milanese (IT); Lorenzo Bracco, Chivasso (IT); Roberto Mura, Milan (IT); Stefano Paolo Rivolta, Desio (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

(21) Appl. No.: 17/527,989

(22) Filed: Nov. 16, 2021

(65) Prior Publication Data

US 2022/0174203 A1 Jun. 2, 2022

(30) Foreign Application Priority Data

Nov. 27, 2020 (IT) .......................... 102020000028790

(51) Int. Cl.
*H04N 5/235* (2006.01)

(52) U.S. Cl.
CPC ................................ *H04N 5/2357* (2013.01)

(58) Field of Classification Search
CPC .................................................... H04N 5/2357
See application file for complete search history.

(56) References Cited

U.S. PATENT DOCUMENTS

| 10,324,214 | B2 | 6/2019 | Aponte Luis |
| 2004/0080630 | A1* | 4/2004 | Kim ........................ H04N 5/235 348/226.1 |
| 2008/0309791 | A1 | 12/2008 | Nishiwaki et al. |
| 2014/0232516 | A1 | 8/2014 | Stivoric et al. |
| 2016/0342781 | A1 | 11/2016 | Jeon |
| 2019/0227354 | A1 | 7/2019 | Hayashida et al. |
| 2021/0281783 | A1* | 9/2021 | Nam .................. H04N 5/37455 |
| 2021/0352203 | A1* | 11/2021 | Zhou .................... H04N 5/2357 |

FOREIGN PATENT DOCUMENTS

| EP | 2 980 609 A1 | 2/2016 |
| KR | 10-2011-0061750 A | 6/2011 |

\* cited by examiner

*Primary Examiner* — Daniel M Pasiewicz
(74) *Attorney, Agent, or Firm* — Seed Intellectual Property Law Group LLP

(57) ABSTRACT

A device includes a charge variation sensor having at one or more electrodes. The charge variation sensor, in operation, generates a charge variation signal indicative of changes in an electric or electrostatic charge induced on the one or more electrodes by an alternating current power source. Processing circuitry, coupled to the charge variation sensor, generates a frequency spectrum signal based on the charge variation signal and identifies a frequency of operation associated with the alternating current power source based on the generated frequency spectrum signal. A control signal is generated based on the identified frequency of operation. An image acquisition device sets an image acquisition frequency based on the control signal.

28 Claims, 3 Drawing Sheets

METHOD FOR DETERMINING THE FREQUENCY OF AN ALTERNATING CURRENT AND RELATED COMPUTER PROGRAM PRODUCT, FREQUENCY SENSING GROUP AND ELECTRONIC APPARATUS COMPRISING THE SENSING GROUP

BACKGROUND

Technical Field

The present disclosure relates to a method for determining the frequency of an alternating current, to a related computer program product, to a frequency sensing group and to an electronic apparatus comprising the sensing group.

Description of the Related Art

As known, conventional light sources (such as incandescent, high intensity discharge and fluorescent lamps) are powered by a power supply to emit light radiation whose intensity is modulated (FIG. 1). In other words, as shown in FIG. 1, the intensity of the emitted light radiation is not constant over time and has a periodic (e.g., sinusoidal) behavior with values comprised between a maximum intensity $I_{max}$ and a minimum intensity $I_{min}$. This derives from the fact that the power supply itself supplies an alternating electric current (with sinusoidal behavior). This alternating electric current has a frequency that varies geographically according to the regulations and specifications of the various countries. For example, the alternating current has a frequency equal to 50 Hz in Europe and has a frequency equal to 60 Hz in the United States and South Korea.

In particular, the modulation frequency of the emitted light radiation is correlated to the frequency of the alternating current (in detail, it is typically equal to twice as much as the frequency of the alternating current).

The intensity modulation of the emitted light is not visible to the naked eye, but is perceivable through image acquisition devices such as photo/video cameras. In fact, it is known that the intensity modulation of the emitted light causes unwanted effects in photos and videos, such as flickering and banding: the flickering consists in a different level of brightness between images (photos/frames) taken in succession to each other; the banding consists in an inhomogeneity of illumination and light/dark in different portions of a same image (and therefore in the generation of bands with different brightness alternating to each other in the same image).

Nowadays, solutions to prevent or reduce such unwanted effects are known, however they require prior knowledge or instantaneous sensing of the light modulation frequency (in detail, whether at 100 Hz or 120 Hz).

For example, several electronic apparatuses (such as smartphones) that comprise a photo/video camera offer the user the possibility to manually select, for example via a graphic interface (e.g., via a smartphone screen), the frequency value of the power supply current of the country where he/she is located (50 Hz or 60 Hz). However, this entails that the user needs to manually set the frequency value of the alternating current, and change it whenever he/she goes to another country that uses different power supply specifications.

Another known solution exploits a dedicated ambient light sensor (e.g., comprising a photodetector) to sense the modulation frequency of the ambient light. However, adding said additional sensor to the electronic apparatus is needed, and this entails an increase in the design complexity of the electronic apparatus itself and in the cost thereof. Furthermore, under certain illumination conditions it might be difficult to correctly sense the light modulation frequency.

A further known solution uses post-processing algorithms applied to the acquired images in order to reduce the flickering and banding effects. For example, these algorithms allow the light intensity between successive frames of a video to be adjusted by calculating an average light intensity between a plurality of said frames, in order to have a more homogeneous level of brightness. However, the flickering may be only reduced and not removed, and the banding phenomenon generally persists even after the application of these algorithms. Furthermore, post-processing might introduce unwanted artifacts into the processed image, thus reducing the quality thereof.

BRIEF SUMMARY

In an embodiment, a method comprises: generating a charge variation signal indicative of changes in an electric or electrostatic charge induced on a charge variation sensor by an alternating current power source, the charge variation sensor having an electrode; generating a frequency spectrum signal based on the charge variation signal; identifying a frequency of operation associated with the alternating current power source based on the generated frequency spectrum signal; and generating a control signal based on the identified frequency of operation.

In an embodiment, a device comprises: a charge variation sensor having at one or more electrodes, wherein the charge variation sensor, in operation, generates a charge variation signal indicative of changes in an electric or electrostatic charge induced on the one or more electrodes by an alternating current power source; and processing circuitry coupled to the charge variation sensor, wherein the processing circuitry, in operation: generates a frequency spectrum signal based on the charge variation signal; identifies a frequency of operation associated with the alternating current power source based on the generated frequency spectrum signal; and generates a control signal based on the identified frequency of operation.

In an embodiment, a system comprises: a charge variation sensor having at one or more electrodes, wherein the charge variation sensor, in operation, generates a charge variation signal indicative of changes in an electric or electrostatic charge induced on the one or more electrodes by an alternating current power source; processing circuitry coupled to the charge variation sensor, wherein the processing circuitry, in operation: generates a frequency spectrum signal based on the charge variation signal; identifies a frequency of operation associated with the alternating current power source based on the generated frequency spectrum signal; and generates a control signal based on the identified frequency of operation; and an image acquisition device coupled to the processing circuitry, wherein the image acquisition device, in operation, sets an image acquisition frequency based on the control signal.

In an embodiment, a non-transitory computer-readable medium's contents configure processing circuitry to perform a method, the method comprising: generating a charge variation signal indicative of changes in an electric or electrostatic charge induced on a charge variation sensor by an alternating current power source, the charge variation sensor having an electrode; generating a frequency spectrum signal based on the charge variation signal; identifying a frequency of operation associated with the alternating current power source based on the generated frequency spectrum signal; and generating a control signal based on the identified frequency of operation.

BRIEF DESCRIPTION OF THE SEVERAL VIEWS OF THE DRAWINGS

For a better understanding of the present disclosure, example embodiments are now described, purely by way of non-limiting example, with reference to the accompanying drawings, wherein.

DETAILED DESCRIPTION

Figure 1:
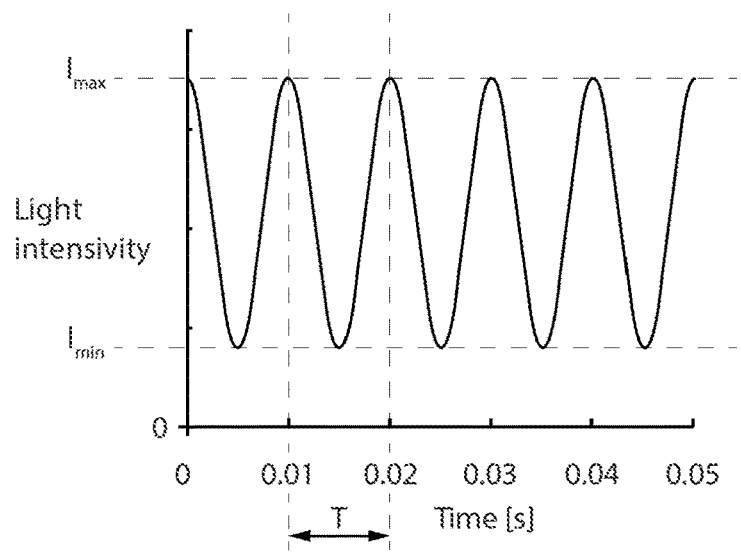
FIG. 1 is a graph that illustrates the behavior of the light intensity emitted by a light source as a function of time.
Figure 2:
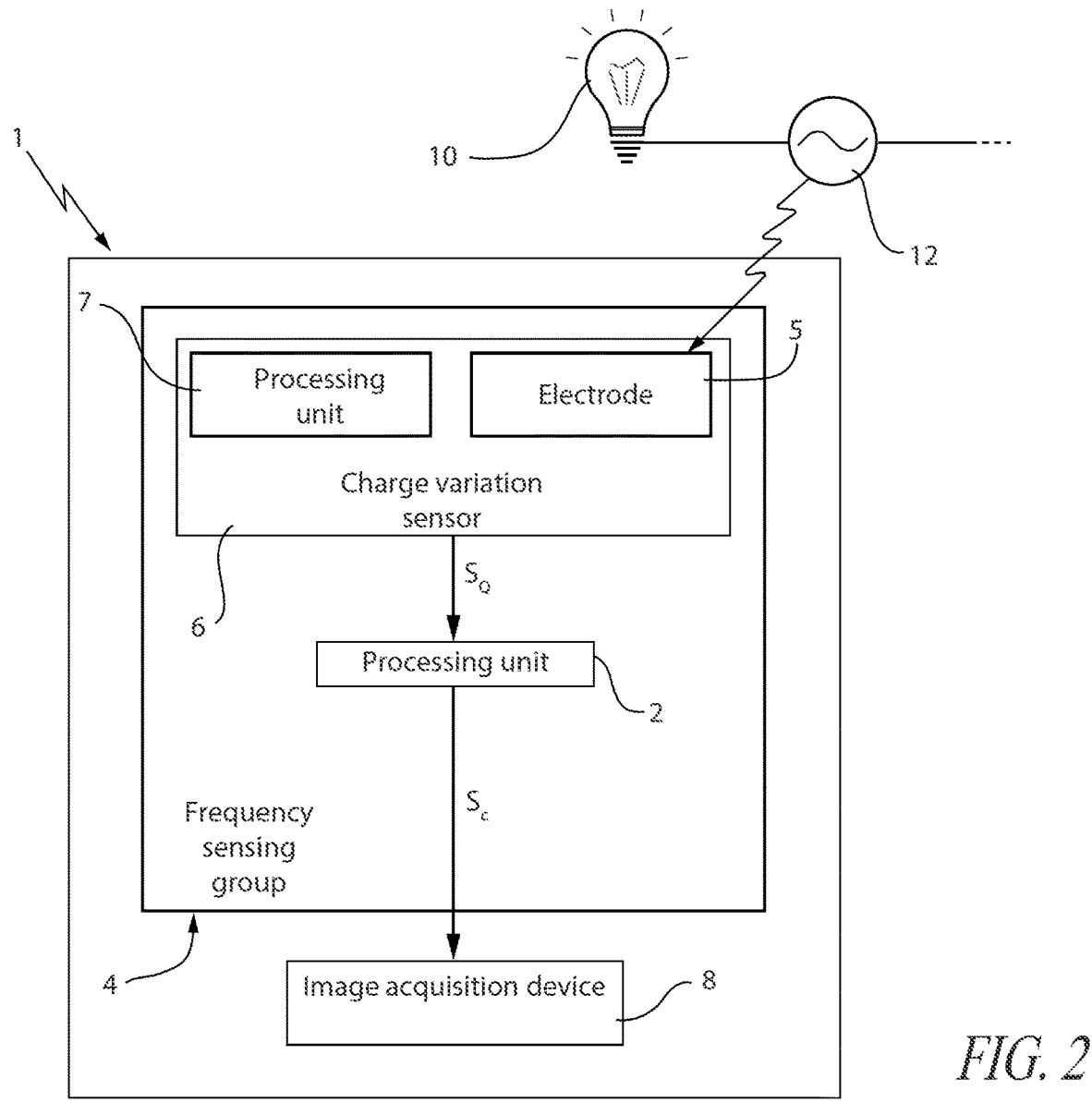
FIG. 2 schematically illustrates an electronic apparatus including a charge variation sensor coupleable to a power supply, according to an embodiment of the present disclosure.

FIG. 2 illustrates, schematically, an electronic apparatus 1 according to an aspect of the present disclosure, comprising a frequency sensing group or circuit 4 (or group 4) and an image acquisition device 8 (such as television camera, photo camera, video camera, webcam, PC camera; hereinafter, also referred to as camera 8) operatively coupled to each other. By way of non-limiting example, the electronic apparatus 1 is a portable electronic device such as a smartphone, a PC, a tablet, a smart home controller (e.g., Google Nest Hub) or a digital photo camera.

In use, the electronic apparatus 1 is placed in an environment provided with at least one light source 10, such as, for example, an incandescent, high intensity discharge or fluorescent lamp. The light source 10 is electrically connected to an electrical power source (hereinafter, power supply) 12 for powering the light source 10 so that the latter emits light radiation in the visible spectrum, to illuminate said environment. Since the power supply 12 supplies an alternating electric current (of sinusoidal type, with own frequency for example equal to about 50 Hz or to about 60 Hz), the power supply 12 also causes an electric/electrostatic charge variation in the environment (e.g., due to objects present in the environment that are electrostatically charged/discharged), due to known electromagnetic effects. The group 4 senses this electric/electrostatic charge and supplies the camera 8 with information indicative of a sensed electric/electrostatic charge variation frequency (equal to the frequency of the alternating current), in order to adapt a setting of the camera 8 according to this information (in particular, in order to set an image acquisition frequency of the camera 8 to a multiple value or integer divider value of the sensed electric/electrostatic charge variation frequency).

In greater detail, the frequency sensing group or circuit 4 comprises a processing unit or circuitry 2 and an electric/electrostatic charge variation sensor (hereinafter referred to as charge variation sensor and identified with the reference number 6) coupled to each other. For example, the charge variation sensor 6 is integrated in the frequency sensing group 4. The processing circuitry 2 is, in one embodiment, a microcontroller integrated in the group 4.

The charge variation sensor 6 comprises an electrode 5 to sense the electric/electrostatic charge variation generated by the power supply 12 in the environment. The electrode 5 may have a metal surface or be totally of metal coated with a dielectric material, or even have a metal surface placed under a case of the group 4. In any case, during use, this electrode 5 is electrically/electrostatically coupled to the power supply 12 to sense the electric/electrostatic charge variation.

According to an embodiment, the electrode 5 is integrated in the case of the group 4, and for example comprises a conductive track formed on, or in, a wafer of semiconductor material being part of the group 4. According to a different embodiment, the electrode 5 is a metal element present in the electronic apparatus 1, such as the case of the group 4 or an outer case or a frame of the electronic apparatus 1 itself. Optionally, when a possible use of the electronic apparatus 1 in a humid environment (more specifically in water) is expected, the electrode 5 is inserted inside a water resistant case, or in any case it is shielded through one or more protective layers, so as to prevent a direct contact of the electrode 5 with water or humidity: in this case, the water resistant case or the one or more protective layers are of such material (e.g., dielectric or insulating material, such as plastics) as not to shield the electric/electrostatic charge generated by the power supply 12, which is to be acquired by the electrode 5. Other embodiments are possible, as apparent to the person skilled in the art, so that the electrode 5 is electrostatically coupled to the power supply 12 during use.

Optionally, the charge variation sensor 6 further comprises a processing circuit or core 7 coupled to the electrode 5 and to the processing unit or circuitry 2. In particular, the processing circuit 7 may comprise an amplification circuit and/or an analog-to-digital converter (ADC), not shown.

In use, the electrode 5 generates an acquisition signal (not shown) according to the sensed electric/electrostatic charge variation in the environment.

The processing circuit 7 receives the acquisition signal from the electrode 5 and processes it (amplifying and/or converting it into a digital signal, according to known techniques) to generate a charge variation signal $S_O$.

The processing unit or circuitry 2 receives the charge variation signal $S_O$ from the charge variation sensor 6 and generates, as described in more detail hereinafter, a sensing signal $S_C$ indicative of the electric/electrostatic charge variation frequency induced by the power supply 12 in the environment.

The camera 8 receives the sensing signal $S_C$ and adapts its own image acquisition frequency according to the electric/electrostatic charge variation frequency, to acquire images/video frames at a constant intensity value of the light radiation. In particular, the image acquisition frequency may be set to a multiple value or integer divider value of the electric/electrostatic charge variation frequency (e.g., is set to a value equal to twice as much as the electric/electrostatic charge variation frequency; in this case, this value coincides with a modulation frequency of the light radiation emitted by the light source 10).

In greater detail, the processing unit 2 of an embodiment implements, in use, a method 100 for sensing a frequency to generate the sensing signal $S_C$. An embodiment of the method 100 is illustrated in FIG. 3 and described hereinafter with reference to a first use mode of the group 4, wherein no external electromagnetic disturbances act on the group 4 (in other words, the charge variation signal $S_Q$ only depends on the power supply 12).

Figure 4:
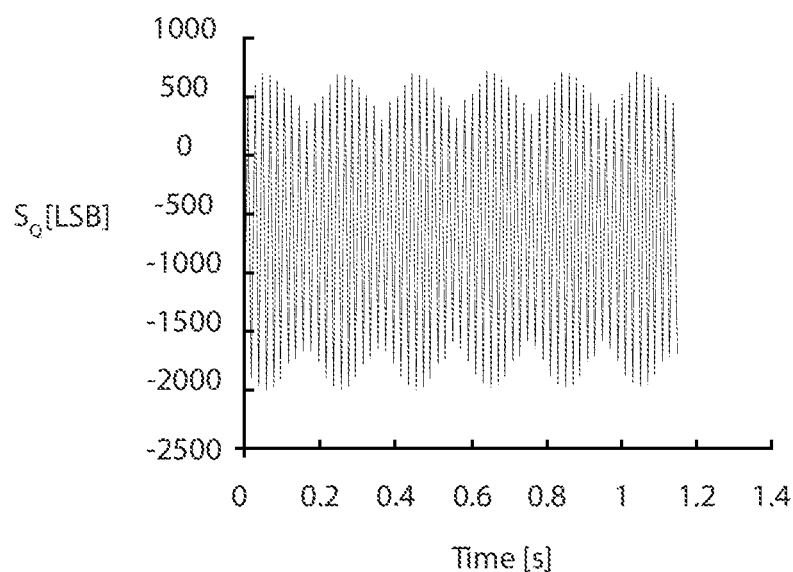
FIG. 4 illustrates, as a function of time, an output signal of the charge variation sensor of FIG. 2 in a first use mode of the same.

The method 100 comprises an acquisition step 102, during a data acquisition period T and at a data acquisition frequency $f_{aq}$, of respective values of the charge variation signal $S_Q$ through the electrode 5. The values of the charge variation signal $S_Q$ are acquired by the processing unit 2, and comprise the analog signals directly sensed by the electrode 5 or the signals acquired by the electrode 5 and processed by the processing circuit 7 (and therefore for example amplified and/or converted into corresponding digital signals). According to the Nyquist's theorem, the frequency $f_{aq}$ is to be equal to, or greater than, twice as much as the frequency of the alternating current supplied by the power supply 12. Since the frequency of the alternating current is generally equal to 50 Hz or to 60 Hz, the frequency $f_{aq}$ is equal, for example, to 208 Hz (e.g., with 128 samplings, and with the period T equal to about 0.62 sec). The acquired values of the charge variation signal $S_Q$ form a data array $V_Q$ whose trend according to time is illustrated in FIG. 4. In other words, FIG. 4 shows the charge variation signal $S_Q$ according to time. In particular, the values of the charge variation signal $S_Q$ show, as time varies, a periodic sinusoidal trend with amplitude modulated at the electric/electrostatic charge variation frequency (and therefore at the frequency of the alternating current supplied by the power supply 12).

Figure 3:
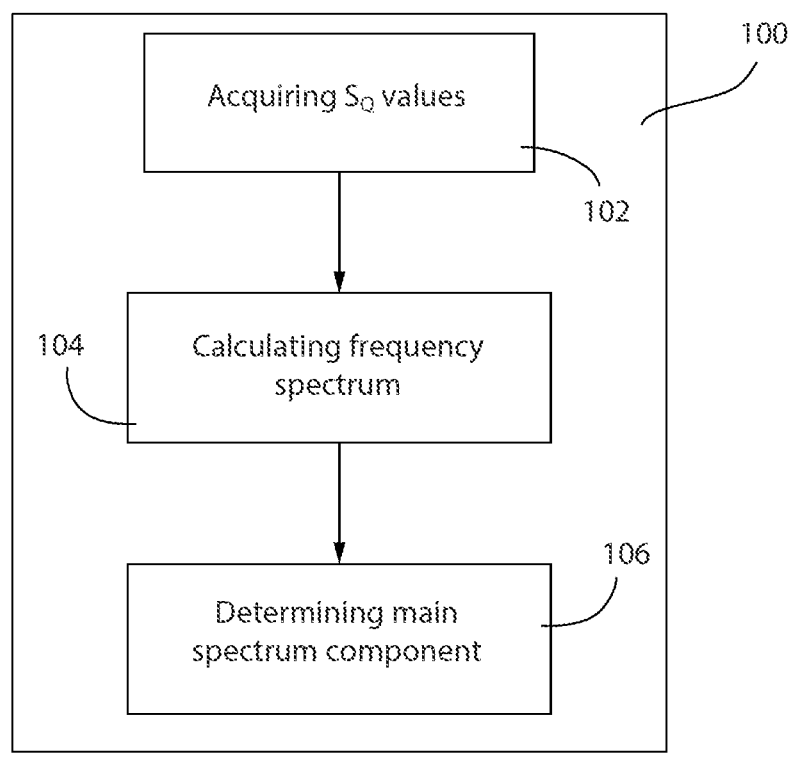
FIG. 3 is a block diagram which illustrates a method for sensing a main frequency component of the electric current supplied by the power supply, from data sensed by the charge variation sensor of FIG. 2, according to an embodiment of the present disclosure.
Figure 5A:
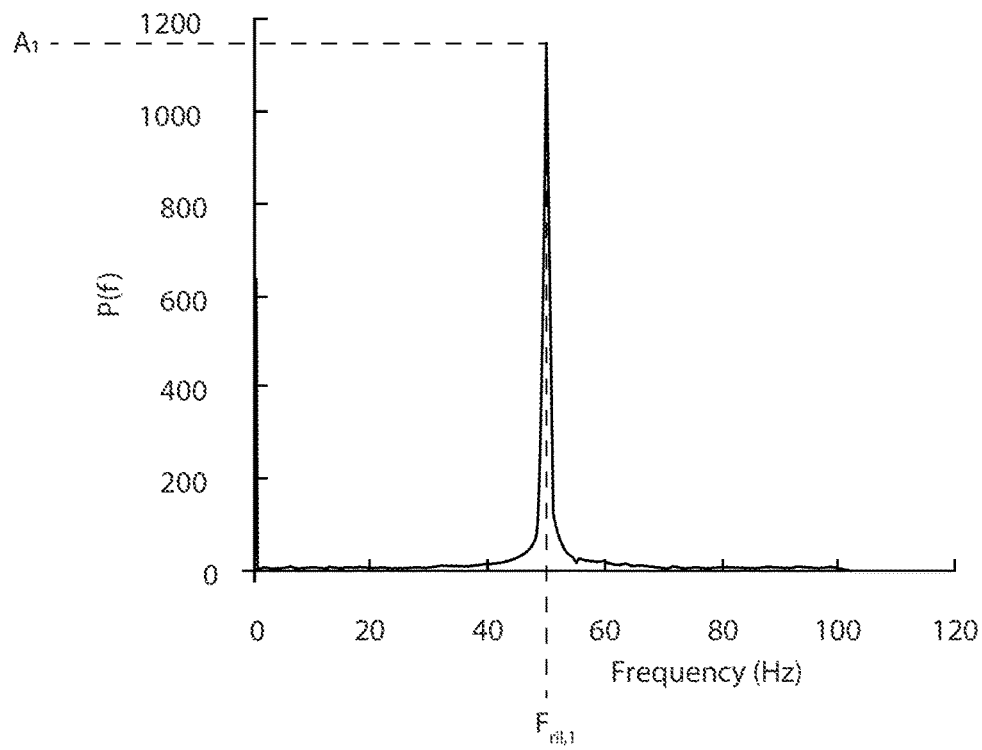
FIG. 5A illustrates a frequency spectrum of the output signal of the charge variation sensor of FIG. 2 in the first use mode of the same.

With reference to method 100 of FIG. 3, a calculation step 104 of a frequency spectrum of the charge variation signal $S_Q$ follows. In particular, the data array $V_Q$ in the time domain is converted into a corresponding converted array $V_Q$ in the frequency domain. The frequency trend of the converted array $V_Q$ (the frequency spectrum of the charge variation signal $S_Q$) is illustrated in FIG. 5A. The calculation of the converted array $V_Q$ is carried out through frequency processing techniques such as Fast Fourier Transform (FFT), in one of the possible implementations thereof.

A determination step 106 of a main frequency component (also referred to as frequency of interest) of the calculated spectrum, which corresponds to the electric/electrostatic charge variation frequency (and therefore to the frequency of the alternating current supplied by the power supply 12), further follows. The sensing signal $S_C$ generated at the output of the processing unit 2 and received by the camera 8 is indicative of the value of the determined main frequency component, and for example is a digital signal with a value equal to the value of the main frequency component. Consequently, the sensing signal $S_C$ is indicative of the frequency of the alternating current supplied by the power supply 12.

According to an embodiment of the determination step 106, the main frequency component is equal to the frequency having a spectrum value greater than, or equal to, a threshold value corresponding thereto. If the spectrum values are all smaller than the threshold value, the main frequency component is not defined or may be set to a default value (e.g., 50 Hz or 60 Hz). The threshold value depends on factors such as the area or the material of the electrode 5, and may be defined accordingly during the design step of the group 4. By way of non-limiting example, the threshold value may vary between about 0.1 mV and about 0.2 mV.

For example, in the first use mode, the frequency spectrum of the charge variation signal $S_Q$ has a main peak at a frequency $f_{ril,1}$ (in FIG. 5A exemplarily equal to 50 Hz). In this case the main frequency component is equal to the frequency $f_{ril,1}$ if the main peak has a maximum amplitude $A_1$ greater than, or equal to, the threshold value.

According to another embodiment of the determination step 106, the main frequency component is chosen from among a plurality of frequencies of interest (generally, 50 Hz and 60 Hz), identifying to which of these frequencies of interest a spectrum value greater than, or equal to, the threshold value corresponds. If a respective spectrum value smaller than the threshold value corresponds to each frequency of interest, the main frequency component is not defined or is set equal to a default value (e.g., 50 Hz or 60 Hz).

According to a different embodiment of the determination step 106, the main frequency component is equal to the average (alternatively median or weighted average) of the frequencies having spectrum values greater than, or equal to, the threshold value associated thereto. If the spectrum values are all smaller than the threshold value, the main frequency component is not defined or is equal to the default value. In this manner, the frequency of the alternating current supplied by the power supply 12 may be accurately calculated.

According to another embodiment of the determination step 106, the main frequency component is equal to the frequency having a maximum spectrum value corresponding thereto.

For example, electromagnetic disturbances that act on the group 4 are present in the environment in a second use mode of the group 4. The electromagnetic disturbances are for example due to bodies emitting electromagnetic radiation present in the environment, or to bodies present in the environment that dynamically interfere with the electric/electrostatic charge generated by the power supply 12 (e.g., a person moving in the environment or touching the electrode 5); in this case the charge variation signal $S_Q$ depends both on the power supply 12 and on these bodies.

Figure 5B:
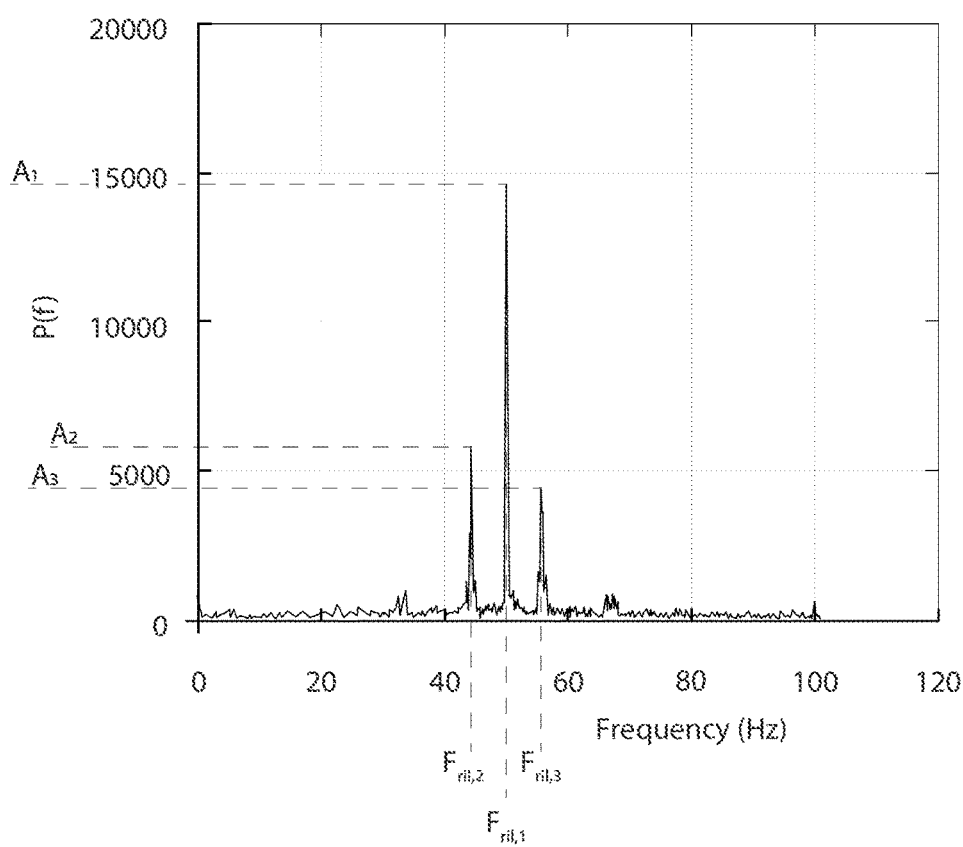
FIG. 5B illustrates a frequency spectrum of the output signal of the charge variation sensor of FIG. 2 in a second use mode of the same.

FIG. 5B shows the frequency spectrum of the charge variation signal $S_Q$ in case the group 4 is operated in the second use mode, and for example when a person touches the electrode 5 in a repeated and periodic manner. In this case, the frequency spectrum of the charge variation signal $S_Q$ shows a plurality of peaks, and in particular shows the main peak at frequency $f_{ril,1}$ and two secondary peaks generated by the electromagnetic disturbances acting on the group 4. For example, the two secondary peaks are at respective frequencies $f_{ril,2}$ and $f_{ril,3}$ and have respective maximum amplitudes $A_2$ and $A_3$ smaller than the maximum amplitude $A_1$ of the main peak. In this case, the main frequency component is equal to the frequency $f_{ril,1}$ because $A_1 > A_2$ and $A_1 > A_3$. Alternatively, the main frequency component is equal to the frequency $f_{ril,1}$ if the maximum amplitude $A_1$ is greater than, or equal to, the threshold value.

According to a first operating mode of the electronic apparatus 1, the method 100 is carried out by the processing unit 2 periodically and in real time (e.g., with a frequency equal to 1 Hz), in such a way that the camera 8 periodically updates the image acquisition frequency according to the sensing signal $S_C$.

According to a second operating mode of the electronic apparatus 1, the method 100 is carried out by the processing unit 2 each time the camera 8 is turned on or operated (e.g., prior to acquiring an image or a video), in such a way that the camera 8 does not constantly update the image acquisition frequency according to the sensing signal $S_C$, but only when it is actually necessary to have this information. Optionally, in addition to what has been described for the second operating mode, the method 100 may in any case be periodically carried out with lower frequency with respect to what has been previously described (e.g., every minute or hour), so as to periodically update the setting of the camera 8 while reducing the computational load with respect to the case discussed with reference to the first operating mode.

From an examination of the characteristics of the disclosure made according to the present disclosure, the advantages that it facilitates obtaining are apparent.

In particular, the frequency of the alternating current supplied by the power supply 12 may be accurately and automatically acquired, by sensing the electric/electrostatic charge on the electrode 5. This allows the image acquisition frequency of the camera 8 to be set to a multiple value or integer divider value of the frequency of the alternating current, to acquire images/video frames at said constant intensity value of the light radiation generated by the light source 10. This avoids or reduces the impact of the flickering and banding phenomena discussed hereinabove.

The group 4 carries out the method 100 with reduced power consumption and computational cost, and has low cost. Furthermore, the structure of the charge variation sensor 6 (and, in detail, of the electrode 5) is not complex. This allows the group 4 to be integrated into consumer electronic apparatuses 1, optimizing the performance thereof without significantly affecting the overall cost.

Furthermore, the group 4 may be used, in addition to the calculation of the sensing signal $S_C$ for the control of the camera 8, also for other applications, such as human presence sensing, pedometer and touch sensing.

Finally, it is clear that modifications and variations may be made to the disclosure described and illustrated herein without thereby departing from the scope of protection of the present disclosure.

For example, in the embodiment wherein the charge variation sensor 6 does not comprise the processing circuit 7, the sensing signal $S_C$ coincides with the acquisition signal generated by the electrode 5, and the amplification and/or conversion operations of the acquisition signal are carried out by the processing unit 2.

Furthermore, the charge variation sensor 6 may comprise a plurality of electrodes 5. The electrodes 5 may have the same parameters (e.g., geometric shape, size, material) as each other, in order to improve the sensing efficiency and to generate the analog acquisition signal having a greater amplitude than what has been described hereinabove, or the electrodes 5 may have parameters different from each other, in order to allow a greater range of charge variation signals to be sensed. Optionally, the signal acquisition by the plurality of electrodes 5 may occur in a differential manner (e.g., the signals of two electrodes 5 are sensed in a differential manner).

Optionally, the signals acquired by the electrode 5 may be filtered to isolate one or more frequency components. For example, the filtering step is carried out by the processing circuit 7 or by the processing unit 2, and comprises applying a first bandpass filter at about 50±2 Hz and a second bandpass filter at about 60±2 Hz.

A method (100) for determining a frequency of interest of an alternating electric current supplied by a power source (12), may be summarized as including the steps of:

generating, through a charge variation sensor (6) provided with an electrode (5) electrically or electrostatically coupled to the power source (12), a charge variation signal ($S_Q$) which is indicative of an electric or electrostatic charge induced, at said electrode (5), by said alternating electric current;

calculating (104), by the processing unit (2), a frequency spectrum of the charge variation signal ($S_Q$); identifying (106), by the processing unit (2), said frequency of interest on the basis of the calculated frequency spectrum; and generating, by the processing unit (2), a sensing signal ($S_C$) indicative of the identified frequency of interest.

The power source (12) may be electrically coupleable to a light source (10) configured to receive the alternating electric current and to generate a light radiation, and wherein the processing unit (2) may be operatively coupled to an image acquisition device (8) configured to sense said light radiation, the method including the step of acquiring, by the image acquisition device (8), images at a constant intensity value of the light radiation.

The step of acquiring the images may include receiving, by the image acquisition device (8), the sensing signal ($S_C$) generated by the processing unit (2); and setting, by the image acquisition device (8), an own image acquisition frequency as a function of said frequency of interest.

The step of identifying (106) the frequency of interest may include determining a frequency spectrum value which may be greater than, or equal to, a threshold value.

The frequency of interest may be included in one of the ranges 50±2 Hz and 60±2 Hz.

The step of identifying (106) the frequency of interest may include determining a plurality of values of the frequency spectrum, associated with a respective plurality of frequencies, which are greater than, or equal to, a threshold value, the frequency of interest being obtained by statistically processing said plurality of frequencies.

The frequency of interest may be calculated as average, or weighted average, or median, of said plurality of frequencies.

The step of identifying (106) the frequency of interest may include determining a maximum value of the frequency spectrum.

The step of calculating (104) the frequency spectrum may include processing the charge variation signal ($S_Q$) through fast Fourier transform.

The method may include the step of acquiring, by the processing unit (2), at a plurality of time instants, a respective plurality of values of the charge variation signal ($S_Q$) through the charge variation sensor (6).

The step of generating (102) the charge variation signal ($S_Q$) may include processing the charge variation signal ($S_Q$) through the processing unit (2) or through a processing circuit (7) of the charge variation sensor (6).

The step of processing the charge variation signal ($S_Q$) may include at least one of: amplifying the charge variation signal ($S_Q$); filtering the charge variation signal ($S_Q$); and converting the charge variation signal ($S_Q$) to digital.

The step of filtering the charge variation signal ($S_Q$) may include applying a first bandpass filter at 50±2 Hz and a second bandpass filter at 60±2 Hz to the charge variation signal ($S_Q$).

The method may be carried out periodically.

The method may be carried out when the sensing group (4) receives a switch-on command.

A sensing group (4) for determining a frequency of interest of an alternating electric current supplied by a power source (12), may be summarized as including a processing unit (2) and a charge variation sensor (6), the charge variation sensor (6) being provided with an electrode (5) electrically or electrostatically coupleable to the power source (12), and being configured to generate a charge variation signal ($S_Q$) which is indicative of an electric or electrostatic charge induced, at said electrode (5), by said alternating electric current, the processing unit (2) being configured for calculating (104) a frequency spectrum of the charge variation signal ($S_Q$); identifying (106) said frequency of interest on the basis of the calculated frequency spectrum; and generating a sensing signal ($S_C$) indicative of the identified frequency of interest.

The charge variation sensor (6) may include a processing circuit (7) to process the charge variation signal ($S_Q$).

The processing circuit (7) may include at least one of: an amplification circuit; a filter circuit; and an analog-to-digital converter.

An electronic apparatus (1) may be summarized as including a sensing group (4).

The power source (12) may be electrically coupleable to a light source (10) configured to receive the alternating electric current and to generate a light radiation, the electronic apparatus (1) may further include an image acquisition device (8), to sense said light radiation, operatively coupled to the processing unit (2), and wherein the image acquisition device (8) may be configured to acquire images at a constant intensity value of the light radiation.

The image acquisition device (8) may be configured to receive the sensing signal ($S_C$) generated by the processing unit (2), and to set an own image acquisition frequency as a function of said frequency of interest.

The image acquisition frequency may be set to a multiple value or integer divider value of the frequency of interest. A computer program product loadable into a processing unit (2) of a sensing group (4) may be summarized as including a charge variation sensor (6) provided with an electrode (5) electrically or electrostatically coupled to a power source (12) adapted to supply an alternating electric current at a frequency of interest, the charge variation sensor (6) being configured to generate a charge variation signal ($S_Q$) which is indicative of an electric or electrostatic charge induced, at said electrode (5), by said alternating electric current, said computer program being designed in such a way that, when executed, the processing unit (2) becomes configured for calculating (104) a frequency spectrum of the charge variation signal ($S_Q$); identifying (106) said frequency of interest on the basis of the calculated frequency spectrum; and generating a sensing signal ($S_C$) indicative of the identified frequency of interest.

In an embodiment, a method comprises: generating a charge variation signal indicative of changes in an electric or electrostatic charge induced on a charge variation sensor by an alternating current power source, the charge variation sensor having an electrode; generating a frequency spectrum signal based on the charge variation signal; identifying a frequency of operation associated with the alternating current power source based on the generated frequency spectrum signal; and generating a control signal based on the identified frequency of operation. In an embodiment, the method comprises setting an image acquisition frequency of an image acquisition device based on the control signal. In an embodiment, the alternating current power source is coupled to a light source configured to generate light radiation, and the method comprises acquiring, by the image acquisition device, images at an intensity value of the light radiation. In an embodiment, the identifying the frequency of operation comprises determining a frequency spectrum value having an amplitude which is greater than, or equal to, a threshold value. In an embodiment, the identifying the frequency of operation comprises determining a plurality of values of the frequency spectrum signal, associated with a respective plurality of frequencies, having amplitudes which are greater than, or equal to, a threshold value, the frequency of operation being obtained by statistically processing the plurality of frequencies. In an embodiment, the identifying the frequency of operation comprises determining a frequency of the frequency spectrum signal having a largest amplitude. In an embodiment, the generating the frequency spectrum signal comprises applying a fast Fourier transform to the charge variation signal. In an embodiment, the method comprises acquiring, at a plurality of time instants, a respective plurality of values of the charge variation signal. In an embodiment, the method comprises: amplifying the charge variation signal; filtering the charge variation signal; converting the charge variation signal to a digital signal; or combinations thereof. In an embodiment, the method comprises applying a first bandpass filter at 50±2 Hz and a second bandpass filter at 60±2 Hz to the charge variation signal. In an embodiment, the method is carried out periodically. In an embodiment, the method is carried out in response to a switch-on command.

In an embodiment, a device comprises: a charge variation sensor having at one or more electrodes, wherein the charge variation sensor, in operation, generates a charge variation signal indicative of changes in an electric or electrostatic charge induced on the one or more electrodes by an alternating current power source; and processing circuitry coupled to the charge variation sensor, wherein the processing circuitry, in operation: generates a frequency spectrum signal based on the charge variation signal; identifies a frequency of operation associated with the alternating current power source based on the generated frequency spectrum signal; and generates a control signal based on the identified frequency of operation. In an embodiment, the charge variation sensor comprises a processing circuit, which, in operation, processes the charge variation signal. In an embodiment, the processing circuit comprises at least one of: an amplification circuit; a filter circuit; or an analog-to-digital converter. In an embodiment, the processing circuitry, in operation, identifies the frequency of operation by determining a frequency spectrum value having an amplitude which is greater than, or equal to, a threshold value. In an embodiment, wherein the processing circuitry, in operation: determines a plurality of values of the frequency spectrum signal, associated with a respective plurality of frequencies, having amplitudes which are greater than, or equal to, a threshold value; and statistically processes the plurality of frequencies to identify the frequency of operation. In an embodiment, processing circuitry, in operation, identifies the frequency of operation by determining a frequency of the frequency spectrum signal having a largest amplitude. In an embodiment, the processing circuitry, in operation, applies a fast Fourier transform to the charge variation signal. In an embodiment, the processing circuitry, in operation, acquires, at a plurality of time instants, a respective plurality of values of the charge variation signal. In an embodiment, the processing circuitry includes: an amplifier; a bandpass filter; an analog-to-digital converter; an amplifier and a bandpass filter; an amplifier and an analog-to-digital converter; a bandpass filter and an analog-to-digital converter; or an amplifier, a bandpass filter, and an analog-to-digital converter. In an embodiment, the processing circuitry comprises a first bandpass filter at 50±2 Hz and a second bandpass filter at 60±2 Hz. In an embodiment, the processing circuitry, in operation, periodically generates the control signal. In an embodiment, the processing circuitry, in operation, responds to a switch-on command by generating the control signal.

In an embodiment, a system comprises: a charge variation sensor having at one or more electrodes, wherein the charge variation sensor, in operation, generates a charge variation signal indicative of changes in an electric or electrostatic charge induced on the one or more electrodes by an alternating current power source; processing circuitry coupled to the charge variation sensor, wherein the processing circuitry, in operation: generates a frequency spectrum signal based on the charge variation signal; identifies a frequency of operation associated with the alternating current power source based on the generated frequency spectrum signal; and generates a control signal based on the identified frequency of operation; and an image acquisition device coupled to the processing circuitry, wherein the image acquisition device, in operation, sets an image acquisition frequency based on the control signal. In an embodiment, the image acquisition device, in operation, sets the image acquisition frequency to a multiple value or integer divider value of the frequency of operation. In an embodiment, the processing circuitry, in operation, applies a fast Fourier transform to generate the frequency spectrum signal.

In an embodiment, a non-transitory computer-readable medium's contents configure processing circuitry to perform a method, the method comprising: generating a charge variation signal indicative of changes in an electric or electrostatic charge induced on a charge variation sensor by an alternating current power source, the charge variation sensor having an electrode; generating a frequency spectrum signal based on the charge variation signal; identifying a frequency of operation associated with the alternating current power source based on the generated frequency spectrum signal; and generating a control signal based on the identified frequency of operation. In an embodiment, the method comprises controlling an acquisition frequency of an image acquisition device based on the control signal. In an embodiment, the contents comprises instructions stored in a memory and executed by the processing circuitry.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
generating a charge variation signal indicative of changes in an electric or electrostatic charge induced on a charge variation sensor by an alternating current power source, the charge variation sensor having an electrode;
generating a frequency spectrum signal based on the charge variation signal;
identifying a frequency of operation associated with the alternating current power source based on the generated frequency spectrum signal; and
generating a control signal based on the identified frequency of operation.

2. The method of claim 1, comprising setting an image acquisition frequency of an image acquisition device based on the control signal.

3. The method according to claim 2, wherein the alternating current power source is coupled to a light source configured to generate light radiation, and the method comprises acquiring, by the image acquisition device, images at an intensity value of the light radiation.

4. The method according to claim 1, wherein the identifying the frequency of operation comprises determining a frequency spectrum value having an amplitude which is greater than, or equal to, a threshold value.

5. The method according to claim 1, wherein the identifying the frequency of operation comprises determining a plurality of values of the frequency spectrum signal, associated with a respective plurality of frequencies, having amplitudes which are greater than, or equal to, a threshold value, the frequency of operation being obtained by statistically processing the plurality of frequencies.

6. The method according to claim 1, wherein the identifying the frequency of operation comprises determining a frequency of the frequency spectrum signal having a largest amplitude.

7. The method according to claim 1, wherein the generating the frequency spectrum signal comprises applying a fast Fourier transform to the charge variation signal.

8. The method according to claim 1, comprising acquiring, at a plurality of time instants, a respective plurality of values of the charge variation signal.

9. The method according to claim 1, comprising: amplifying the charge variation signal; filtering the charge variation signal; converting the charge variation signal to a digital signal; or combinations thereof.

10. The method according to claim 1, comprising applying a first bandpass filter at 50±2 Hz and a second bandpass filter at 60±2 Hz to the charge variation signal.

11. The method according to claim 1, wherein the method is carried out periodically.

12. The method according to claim 1, wherein the method is carried out in response to a switch-on command.

13. A device, comprising:
a charge variation sensor having one or more electrodes, wherein the charge variation sensor, in operation, generates a charge variation signal indicative of changes in an electric or electrostatic charge induced on the one or more electrodes by an alternating current power source; and
processing circuitry coupled to the charge variation sensor, wherein the processing circuitry, in operation:
generates a frequency spectrum signal based on the charge variation signal;
identifies a frequency of operation associated with the alternating current power source based on the generated frequency spectrum signal; and
generates a control signal based on the identified frequency of operation.

14. The device according to claim 13, wherein the processing circuitry, in operation, identifies the frequency of operation by determining a frequency spectrum value having an amplitude which is greater than, or equal to, a threshold value.

15. The device according to claim 13, wherein the processing circuitry, in operation:
determines a plurality of values of the frequency spectrum signal, associated with a respective plurality of frequencies, having amplitudes which are greater than, or equal to, a threshold value; and
statistically processes the plurality of frequencies to identify the frequency of operation.

16. The device according to claim 13, wherein processing circuitry, in operation, identifies the frequency of operation by determining a frequency of the frequency spectrum signal having a largest amplitude.

17. The device according to claim 13, wherein the processing circuitry, in operation, applies a fast Fourier transform to the charge variation signal.

18. The device according to claim 13, wherein the processing circuitry, in operation, acquires, at a plurality of time instants, a respective plurality of values of the charge variation signal.

19. The device according to claim 13, wherein the processing circuitry includes:
an amplifier;
a bandpass filter;
an analog-to-digital converter;
an amplifier and a bandpass filter;
an amplifier and an analog-to-digital converter;
a bandpass filter and an analog-to-digital converter; or
an amplifier, a bandpass filter, and an analog-to-digital converter.

20. The device according to claim 13, wherein the processing circuitry comprises a first bandpass filter at 50±2 Hz and a second bandpass filter at 60±2 Hz.

21. The device according to claim 13, wherein the processing circuitry, in operation, periodically generates the control signal.

22. The device according to claim 13, wherein the processing circuitry, in operation, responds to a switch-on command by generating the control signal.

23. A system, comprising:
a charge variation sensor having one or more electrodes, wherein the charge variation sensor, in operation, generates a charge variation signal indicative of changes in an electric or electrostatic charge induced on the one or more electrodes by an alternating current power source;
processing circuitry coupled to the charge variation sensor, wherein the processing circuitry, in operation:
generates a frequency spectrum signal based on the charge variation signal;
identifies a frequency of operation associated with the alternating current power source based on the generated frequency spectrum signal; and
generates a control signal based on the identified frequency of operation; and
an image acquisition device coupled to the processing circuitry, wherein the image acquisition device, in operation, sets an image acquisition frequency based on the control signal.

24. The system according to claim 23, wherein the image acquisition device, in operation, sets the image acquisition frequency to a multiple value or integer divider value of the frequency of operation.

25. The system according to claim 23, wherein the processing circuitry, in operation, applies a fast Fourier transform to generate the frequency spectrum signal.

26. A non-transitory computer-readable medium having contents which configure processing circuitry to perform a method, the method comprising:
generating a charge variation signal indicative of changes in an electric or electrostatic charge induced on a charge variation sensor by an alternating current power source, the charge variation sensor having an electrode;
generating a frequency spectrum signal based on the charge variation signal;
identifying a frequency of operation associated with the alternating current power source based on the generated frequency spectrum signal; and
generating a control signal based on the identified frequency of operation.

27. The non-transitory computer-readable medium of claim 26, wherein the method comprises controlling an acquisition frequency of an image acquisition device based on the control signal.

28. The non-transitory computer-readable medium of claim 26, wherein the contents comprises instructions stored in a memory and executed by the processing circuitry.

* * * * *